United States Patent
Limbasia et al.

(10) Patent No.: US 8,918,773 B2
(45) Date of Patent: Dec. 23, 2014

(54) PARTIALLY UPGRADABLE APPLICATION AND PERFORMING DATABASE OPERATIONS WITH THE APPLICATION

(75) Inventors: Sunil Limbasia, Irving, TX (US); Abhilash Paul, Irving, TX (US); Aravind Perumandla, Irving, TX (US); John J. Christudass, Coppell, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 515 days.

(21) Appl. No.: 13/239,574

(22) Filed: Sep. 22, 2011

(65) Prior Publication Data

US 2013/0081006 A1    Mar. 28, 2013

(51) Int. Cl.
 *G06F 9/44* (2006.01)
 *G06F 9/445* (2006.01)
 *G06F 17/30* (2006.01)

(52) U.S. Cl.
 CPC ............ *G06F 17/30286* (2013.01); *G06F 8/65* (2013.01)
 USPC .............................. 717/168; 717/169; 717/177

(58) Field of Classification Search
 CPC ........................................................ G06F 8/65
 USPC .......................... 707/769–775; 717/168–178; 709/203–208, 212–245
 See application file for complete search history.

(56) References Cited

U.S. PATENT DOCUMENTS

| | | | | |
|---|---|---|---|---|
| 6,233,583 | B1 * | 5/2001 | Hoth | 707/752 |
| 7,680,779 | B2 * | 3/2010 | Chaves | 707/770 |
| 7,720,867 | B2 * | 5/2010 | Subramanian et al. | 707/793 |
| 7,797,331 | B2 * | 9/2010 | Theimer et al. | 707/769 |
| 2010/0082671 | A1 * | 4/2010 | Li et al. | 707/770 |

OTHER PUBLICATIONS

Sugiyama, Kazunari, Kenji Hatano, and Masatoshi Yoshikawa. "Adaptive web search based on user profile constructed without any effort from users." Proceedings of the 13th international conference on World Wide Web. ACM, 2004, pp. 675-684.*

Speretta, Mirco, and Susan Gauch. "Personalized search based on user search histories." Web Intelligence, 2005. Proceedings. The 2005 IEEE/WIC/ACM International Conference on. IEEE, 2005, pp. 1-7.*

Agichtein, Eugene, Eric Brill, and Susan Dumais. "Improving web search ranking by incorporating user behavior information." Proceedings of the 29th annual international ACM SIGIR conference on Research and development in information retrieval. ACM, 2006, pp. 19-26.*

* cited by examiner

*Primary Examiner* — Satish Rampuria

(57) ABSTRACT

A device provides, to a server device, a single request for user information associated with an application provided in the device. The device also receives, from the server device and based on the single request, one or more tables in a same format as stored in the server device, where the one or more tables are not joined by the server device. The device further stores the one or more tables in a database associated with the device, queries the one or more tables in the database for the user information, and provides, to the application, the user information retrieved based on the query.

20 Claims, 8 Drawing Sheets

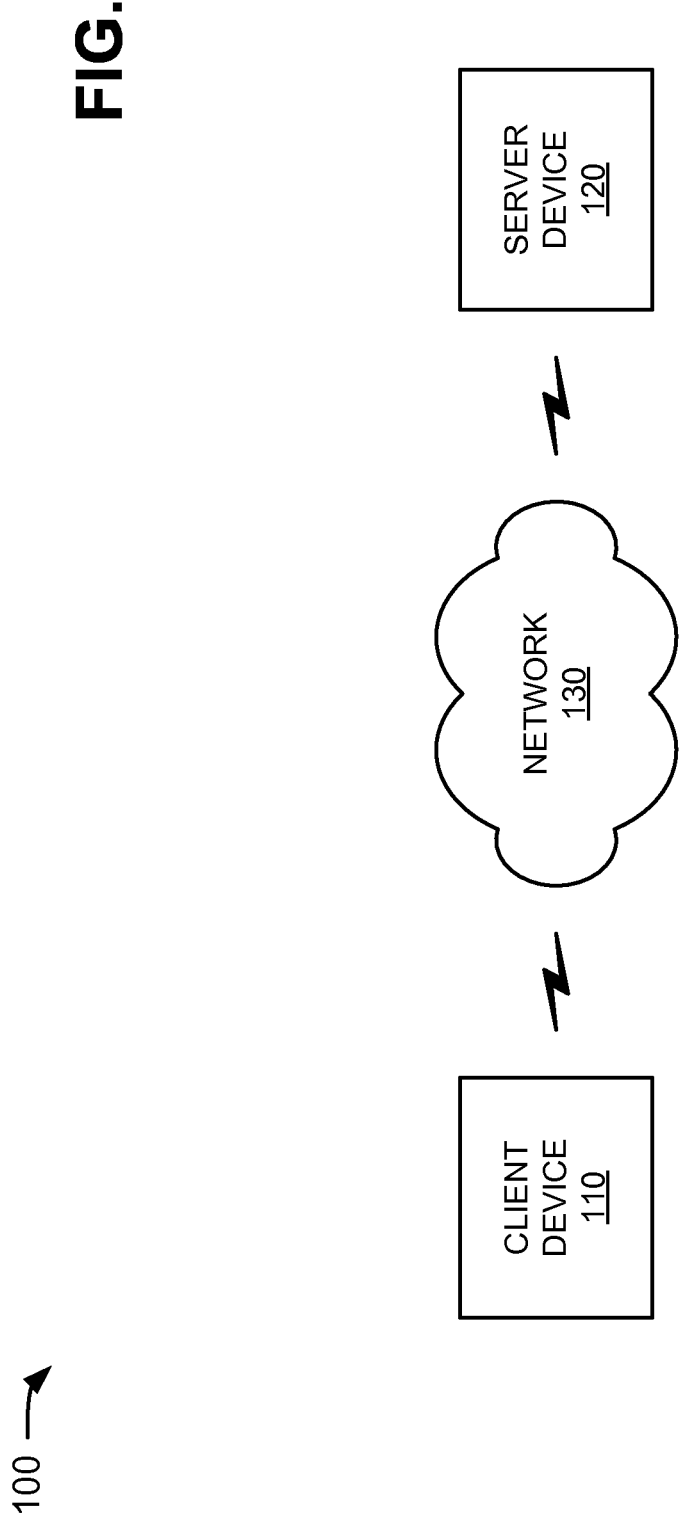

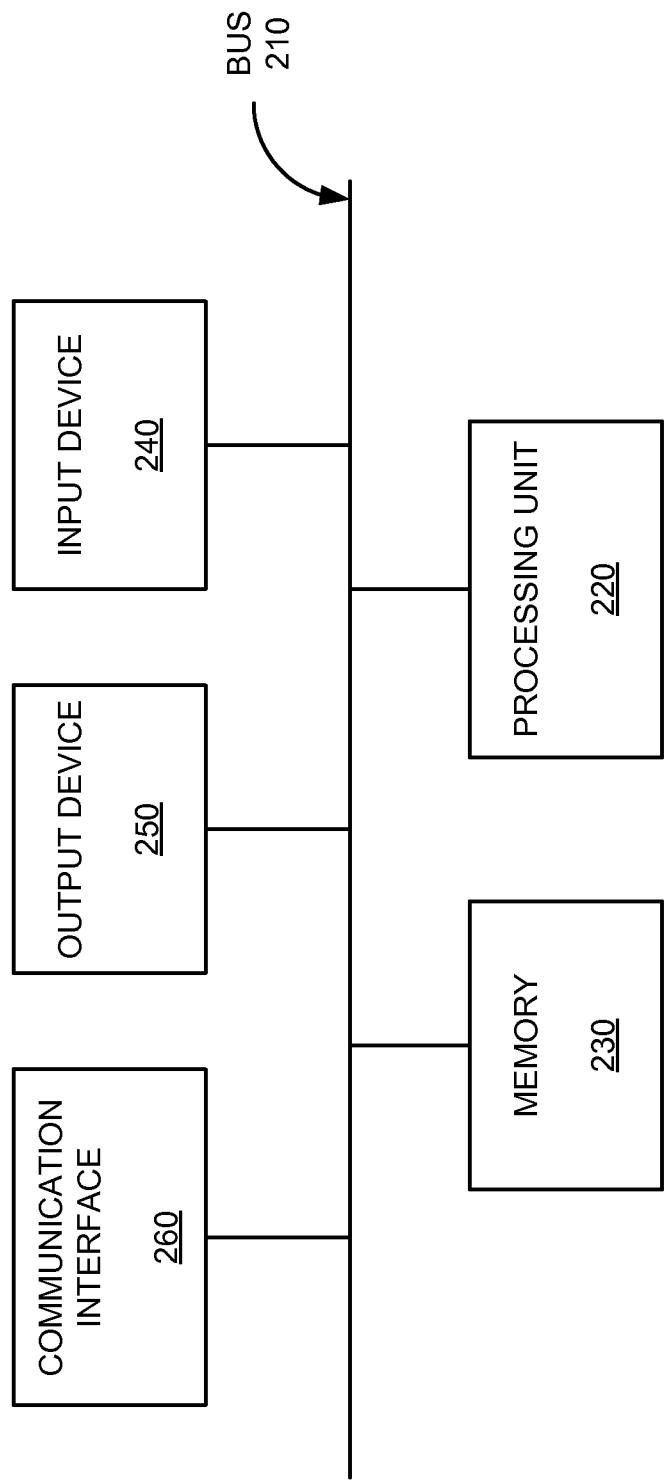

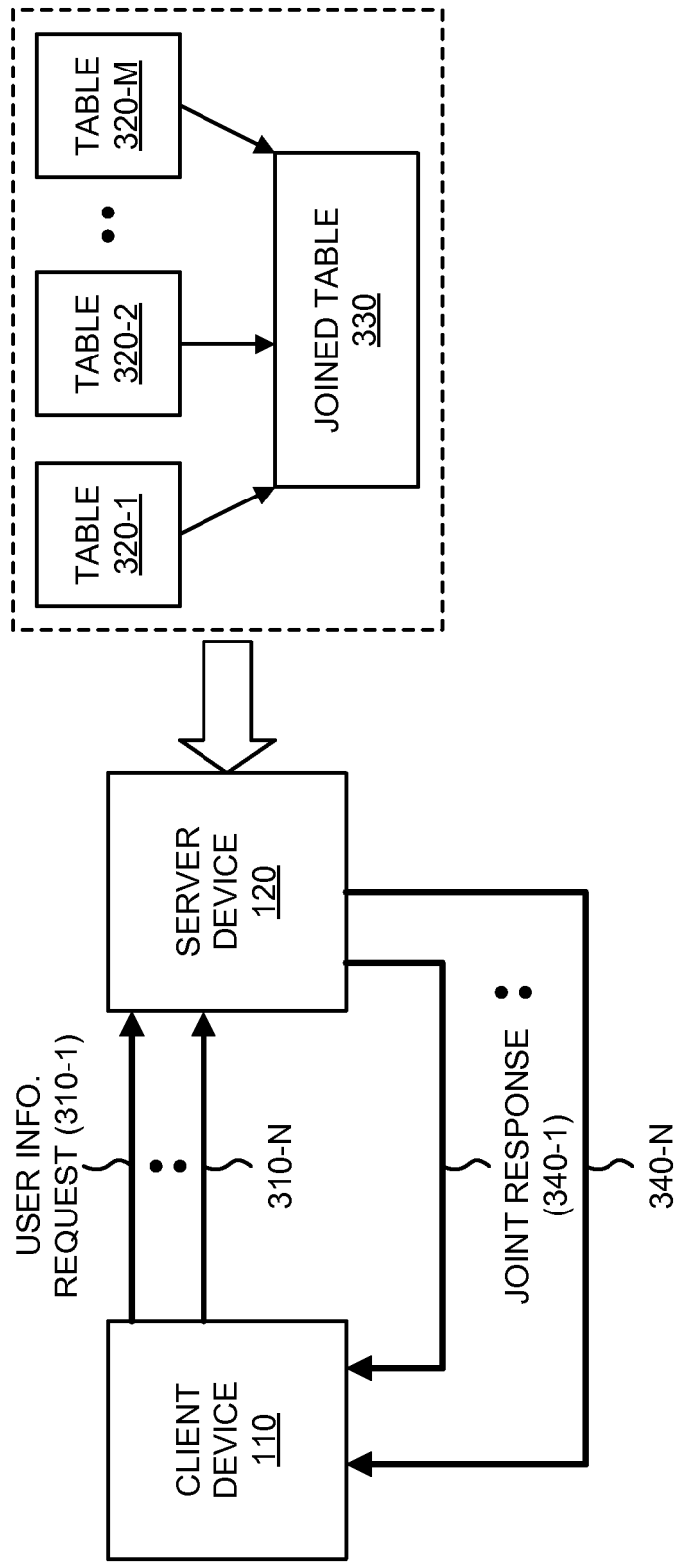

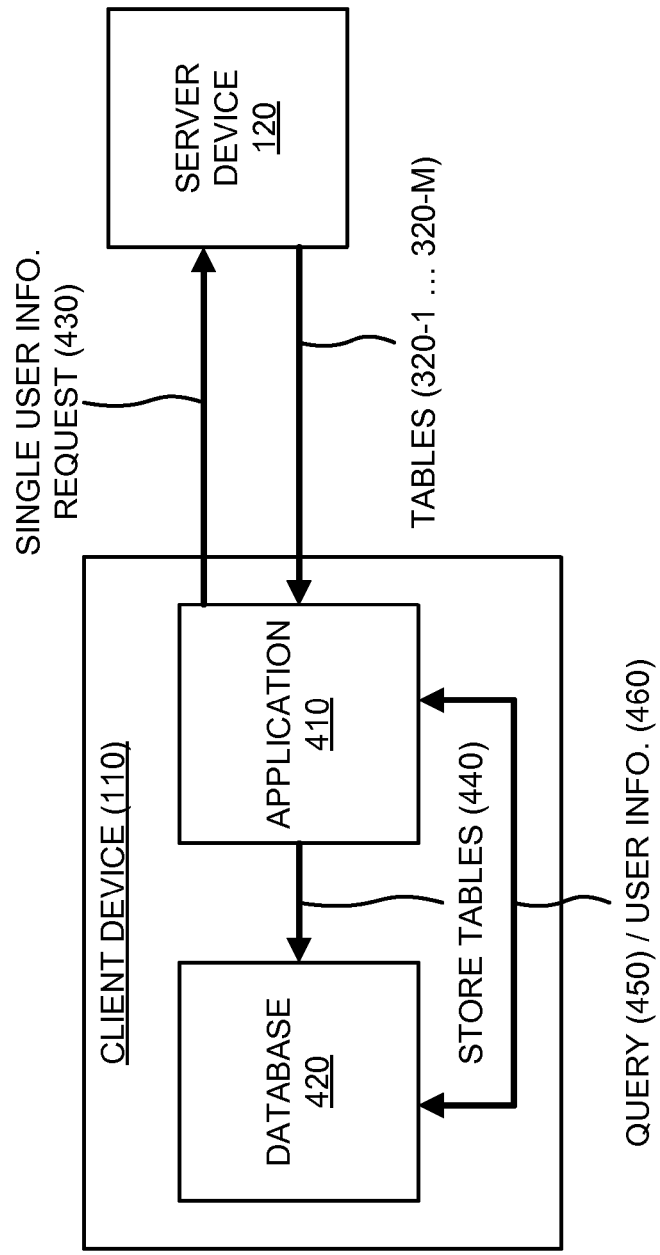

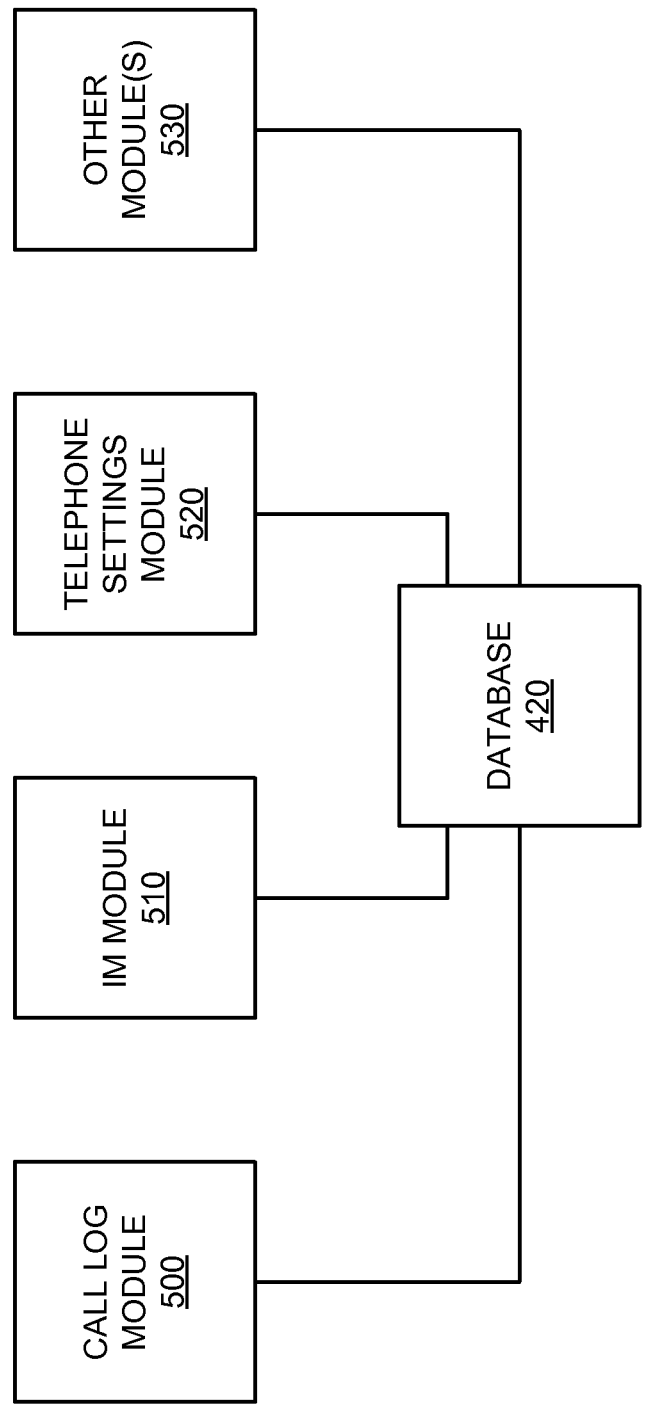

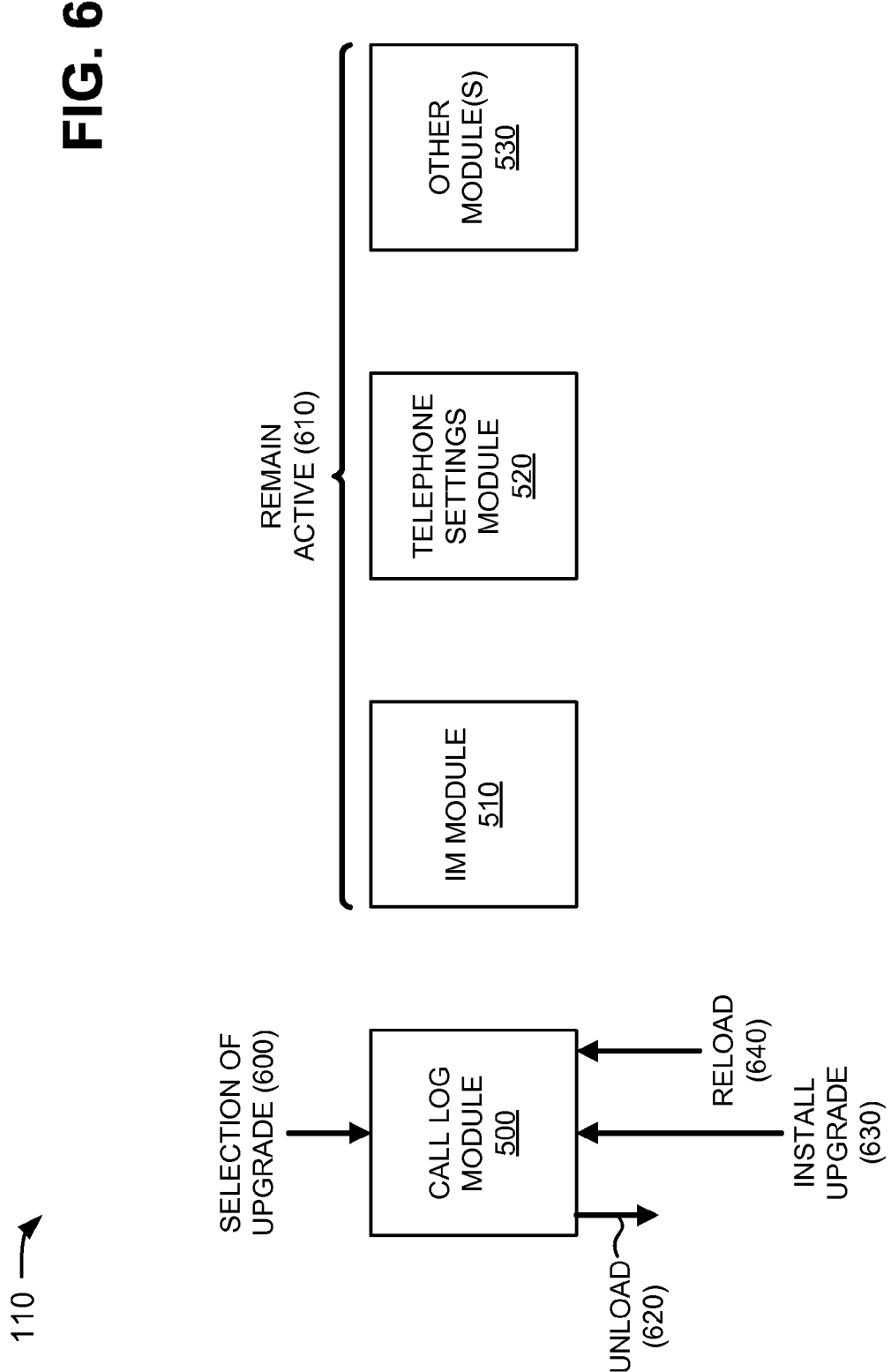

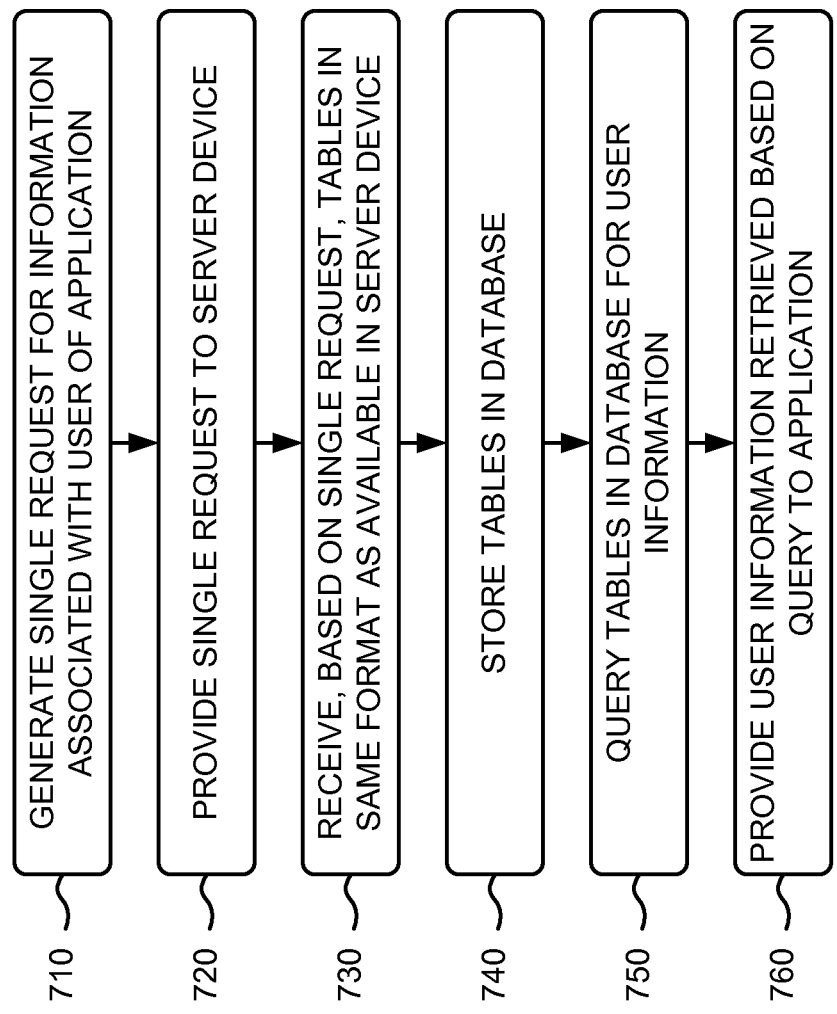

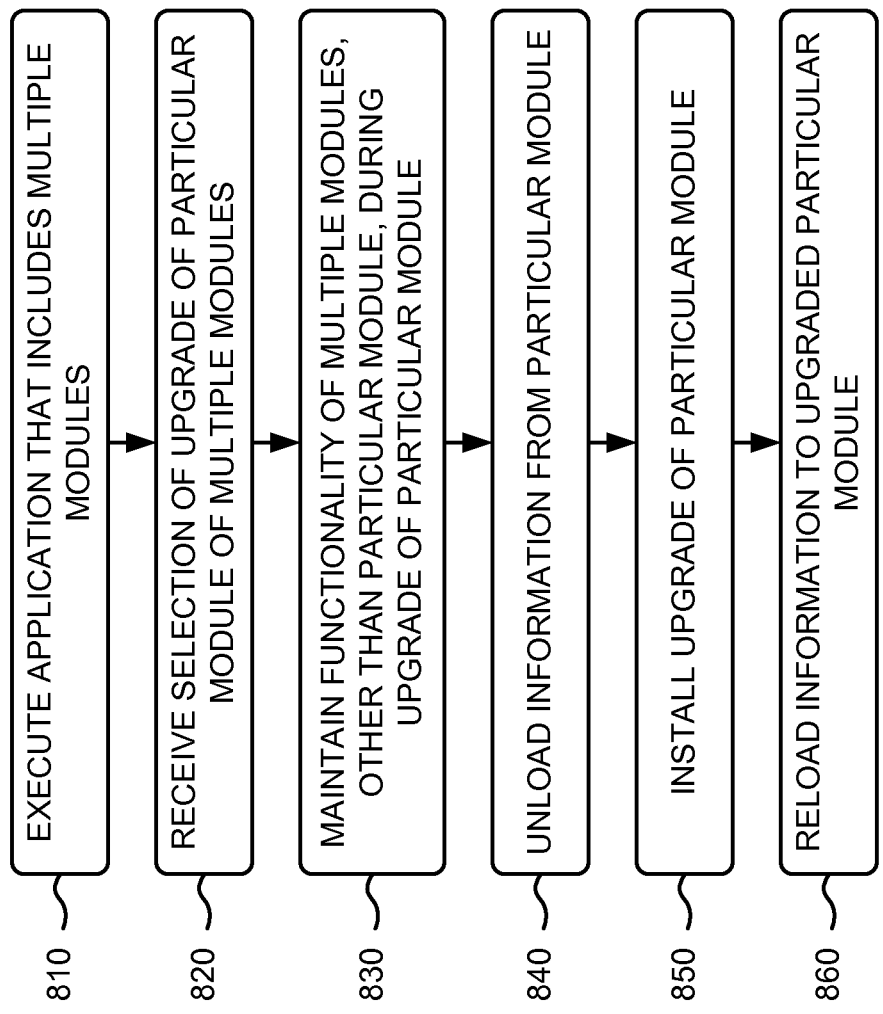

PARTIALLY UPGRADABLE APPLICATION AND PERFORMING DATABASE OPERATIONS WITH THE APPLICATION

BACKGROUND

Some client devices, such as a personal computer, may utilize an application that is associated with a telephone number and enables a user to keep track of telephone call logs and telephone settings (e.g., call forwarding, blocked calls, etc.), to conduct instant messaging sessions with other application users, etc. The application may communicate with a server device associated with a telecommunications provider. The server device may provide the application with information associated with the telephone call logs, telephone settings, etc., and may enable the application to conduct instant messaging sessions with other application users.

BRIEF DESCRIPTION OF THE DRAWINGS

FIG. 1 is a diagram of an example network in which systems and/or methods described herein may be implemented;

FIG. 2 is a diagram of example components of one or more of the devices of the network depicted in FIG. 1;

FIG. 3 is a diagram of example interactions between components of an example portion of the network illustrated in FIG. 1;

FIG. 4 is a diagram of example interactions between components of another example portion of the network depicted in FIG. 1;

FIG. 5 is a diagram of example functional components of a client device illustrated in FIG. 1;

FIG. 6 is a diagram of example interactions associated with the functional components of the client device depicted in FIG. 5;

FIG. 7 is a flow chart of an example process for obtaining information to enable a client device application to access a server device according to an implementation described herein; and FIG. 8 is a flow chart of an example process for upgrading a module of a client device application according to an implementation described herein.

DETAILED DESCRIPTION OF PREFERRED EMBODIMENTS

The following detailed description refers to the accompanying drawings. The same reference numbers in different drawings may identify the same or similar elements.

Systems and/or methods described herein may enable a client device to provide a single request for user information to a server device. The server device may provide the user information to the client device via tables provided in a same format as available in the server device. The client device may extract the user information from the tables, and may provide the user information to a client device application. The systems and/or methods may also enable a portion (e.g., a module) of the client device application to be upgraded without affecting operation of remaining portions of the client device application.

In one example implementation, the client device may generate a single request for information associated with a user of an application to be executed by the client device. The client device may provide the single request to a server device, and may receive, from the server device and based on the single request, tables in a same format as available in the server device. The client device may store the tables in a database associated with the client device, and may query the tables in the database for the user information. The user information retrieved based on the query may be provided by the client device to the application.

Alternatively, or additionally, the client device may execute the application and the application may include multiple portions (e.g., modules). The client device may receive a selection of an upgrade of a particular module of the multiple modules, and may maintain the functionality of the multiple modules, other than the particular module, during the upgrade of the particular module. The client device may unload information from the particular module, may install the upgrade of the particular module, and may reload the information to the upgraded particular module.

As used herein, the term "user" is intended to be broadly interpreted to include a client device, or a user of a client device.

The term "component," as used herein, is intended to be broadly construed to include hardware (e.g., a processor, a microprocessor, an application-specific integrated circuit (ASIC), a field-programmable gate array (FPGA), a chip, a memory device (e.g., a read only memory (ROM), a random access memory (RAM), etc.), etc.) or a combination of hardware and software (e.g., a processor, microprocessor, ASIC, etc. executing software contained in a memory device).

FIG. 1 is a diagram of an example network 100 in which systems and/or methods described herein may be implemented. As illustrated, network 100 may include a client device 110 and a server device 120 interconnected by a network 130. Components of network 100 may interconnect via wired and/or wireless connections. A single client device 110, server device 120, and network 130 have been illustrated in FIG. 1 for simplicity. In practice, there may be more client devices 110, server devices 120, and/or networks 130.

Client device 110 may include any device that is capable of communicating with server device 120 via network 130. For example, client device 110 may include a mobile computation and/or communication device, such as a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a smart phone, a laptop computer, a tablet computer, a global positioning system (GPS) device, a content recording device (e.g., a camera, a video camera, etc.), etc. Alternatively, or additionally, client device 110 may include a fixed (e.g., provided in a particular location, such as within a user's home) computation and/or communication device, such as a personal computer, a workstation computer, a gaming system, etc.

In one example implementation, client device 110 may include an application with functionality and user information provided by server device 120. In order to receive the functionality and user information from server device 120, client device 110 (e.g., via the application) may access or login to server device 120, and may provide a single request for the user information to server device 120. Client device 110 may receive, from server device 120 and based on the single request, tables in a same format as available in the server device. The tables may include user information associated with the user of client device 110. Client device 110 may store the tables in a database associated with client device 110, and may query the tables in the database for the user information. The user information retrieved based on the query may be provided by client device 110 to the application so that the application may, for example, display the user information to the user (e.g., via a user interface).

In one example, the application may enable client device 110 to be associated with one or more telephone numbers (e.g., of communication devices associated with a user of client device 110) and may enable the user to keep track of telephone call logs and telephone settings (e.g., call forwarding, blocked calls, etc.), to conduct instant messaging sessions with other application users, etc. In such an example, the user information, from the tables, provided by server device 110 to the application may include information associated with the telephone call logs, telephone settings, etc., and may enable the application to conduct instant messaging sessions with other application users. Alternatively, or additionally, the application may provide different functionality and/or additional functionality, and the user information may include information associated with the different and/or additional functionality of the application.

Alternatively, or additionally, client device 110 may execute the application and the application may include multiple portions (e.g., modules). For example, the application may include a call log module, an instant messaging (IM) module, a telephone settings module, and/or other modules. Client device 110 may receive a selection of an upgrade of a particular module of the multiple modules, and may maintain the functionality of the multiple modules, other than the particular module, during the upgrade of the particular module. For example, client device 110 may upgrade the call log module without closing instant messaging sessions being conducted via the IM module. Client device 110 may unload information from the particular module, may install the upgrade of the particular module, and may reload the information to the upgraded particular module.

Further details of client device 110 are provided below in connection with, for example, one or more of FIGS. 2-6.

Server device 120 may include one or more server devices, or other types of computation or communication devices (e.g., associated with a telecommunications service provider), that gather, process, and/or provide information in a manner described herein. For example, server device 120 may include a device that communicates with client device 110 (e.g., via network 130) and enables client device 110 to retrieve, from server device 120, user information for the application provided on client device 110, upgrades for one or more portions of the application, etc. In one example implementation, server device 120 may store user information, for multiple users of client devices 110, in a variety of formats, such as in one or more tables. For example, server device 120 may store user information for a call log module of the application in one table, may store user information for an IM module of the application in another table, etc.

Network 130 may include a local area network (LAN), a wide area network (WAN), a metropolitan area network (MAN), a telephone network, such as the Public Switched Telephone Network (PSTN), an intranet, the Internet, an optical fiber (or fiber optic)-based network, a cable television network, a satellite television network, or a combination of networks.

Although FIG. 1 shows example components of network 100, in other implementations, network 100 may include fewer components, different components, differently arranged components, and/or additional components than those depicted in FIG. 1. Alternatively, or additionally, one or more components of network 100 may perform one or more other tasks described as being performed by one or more other components of network 100.

FIG. 2 is a diagram of example components of a device 200 that may correspond to one of the devices of network 100. In one example implementation, one or more of the devices of network 100 may include one or more devices 200. As illustrated in FIG. 2, device 200 may include a bus 210, a processing unit 220, a memory 230, an input device 240, an output device 250, and a communication interface 260.

Bus 210 may permit communication among the components of device 200. Processing unit 220 may include one or more processors or microprocessors that interpret and execute instructions. In other implementations, processing unit 220 may be implemented as or include one or more ASICs, FPGAs, or the like.

Memory 230 may include a RAM or another type of dynamic storage device that stores information and instructions for execution by processing unit 220, a ROM or another type of static storage device that stores static information and instructions for the processing unit 220, and/or some other type of magnetic or optical recording medium and its corresponding drive for storing information and/or instructions.

Input device 240 may include a device that permits an operator to input information to device 200, such as a keyboard, a keypad, a mouse, a pen, a microphone, one or more biometric mechanisms, and the like. Output device 250 may include a device that outputs information to the operator, such as a display, a speaker, etc.

Communication interface 260 may include any transceiver-like mechanism that enables device 200 to communicate with other devices and/or systems. For example, communication interface 260 may include mechanisms for communicating with other devices, such as other devices of network 100.

As described herein, device 200 may perform certain operations in response to processing unit 220 executing software instructions contained in a computer-readable medium, such as memory 230. A computer-readable medium may be defined as a non-transitory memory device. A memory device may include space within a single physical memory device or spread across multiple physical memory devices. The software instructions may be read into memory 230 from another computer-readable medium or from another device via communication interface 260. The software instructions contained in memory 230 may cause processing unit 220 to perform processes described herein. Alternatively, or additionally, hardwired circuitry may be used in place of or in combination with software instructions to implement processes described herein. Thus, implementations described herein are not limited to any specific combination of hardware circuitry and software.

Although FIG. 2 shows example components of device 200, in other implementations, device 200 may include fewer components, different components, differently arranged components, or additional components than depicted in FIG. 2. Alternatively, or additionally, one or more components of device 200 may perform one or more other tasks described as being performed by one or more other components of device 200.

FIG. 3 is a diagram of example interactions between components of an example portion 300 of network 100 (FIG. 1). As illustrated, example network portion 300 may include client device 110 and server device 120. Client device 110 and server device 120 may include the features described above in connection with, for example, one or more of FIGS. 1 and 2.

In order to obtain, from server device 120, user information associated with the application provided on client device 110, the application may provide several user information requests 310-1 through 310-N (collectively referred to herein as "requests 310," and, in some instances, singularly as "request 310") to server device 120. Requests 310 may include requests for user information associated with different modules of the application. For example, request 310-1 may include a request for user information associated with a call log module of the application. Server device 120 may receive requests 310, and may, for each request 310, locate one or more tables 320-1 through 320-M that include user information requested by request 310. In one example, table 320-1 may include user information for the call log module of the application, table 320-2 may include user information for the IM module of the application, table 320-M may include user information for the telephone settings module of the application, etc. Server device 120 may join tables 320-1 through 320-M or portions of one or more tables 320-1 through 320-M together to create a joined table 330. Joined table 330 may include user information relevant to a particular request 310. Thus, for each request 310, server device 120 may provide a joint response, which includes joined table 330, to client device 110. For example, server device 120 may provide a joint response 340-1 in response to user information request 340-1, a joint response 340-N in response to user information request 340-N, etc.

When multiple client devices 110 are providing multiple requests 310 to server device 120, the process of joining tables 320-1 through 320-M for each request may place a heavy load on server device 120. A heavily loaded server device 120 may perform more slowly and may require an inordinate amount of time to provide the user information to client device 110. Thus, client device 110 may not be able to display (e.g., via a user interface) the user information in a timely manner. In order to address this, client device 110 and server device 120 may implement database operations as described below in connection with, for example, FIG. 4.

Although FIG. 3 shows example components of network portion 300, in other implementations, network portion 300 may include fewer components, different components, differently arranged components, and/or additional components than depicted in FIG. 3. Alternatively, or additionally, one or more components of network portion 300 may perform one or more other tasks described as being performed by one or more other components of network portion 300.

FIG. 4 is a diagram of example interactions between components of another example portion 400 of network 100. As illustrated, example network portion 400 may include client device 110 and server device 120. Client device 110 and server device 120 may include the features described above in connection with, for example, one or more of FIGS. 1-3.

As further shown in FIG. 4, client device 110 may include an application 410 and a database 420. Application 410 may include an application with functionality and user information provided by server device 120. In one example, application 410 may enable client device 110 to be associated with one or more telephone numbers (e.g., of communication devices associated with a user of client device 110) and may enable the user to keep track of telephone call logs and telephone settings (e.g., call forwarding, blocked calls, etc.), to conduct instant messaging sessions with other application users, etc. In such an example, the user information provided by server device 110 to application 410 may include information associated with the telephone call logs, telephone settings, etc., and may enable the application to conduct instant messaging sessions with other application users. Alternatively, or additionally, application 410 may provide different functionality and/or additional functionality, and the user information may include information associated with the different and/or additional functionality of application 410. Application 410 may include multiple portions (e.g., modules), such as, for example, a call log module, an IM module, a telephone settings module, and/or other modules (e.g., a voicemail module).

Database 420 may include one or more memory devices associated with client device 110, such as memory 230 (FIG. 2). Database 420 may store information that is accessible to application 410, such as user information retrieved from server device 120.

Instead of generating multiple user information requests, as described above in connection with FIG. 3, application 410 may generate a single user information request 430, and may provide single user information request 430 to server device 120. Single user information request 430 may include a request for user information associated with all of the modules of application 410 (e.g., the call log module, the IM module, the telephone settings module, and/or the other modules).

Server device 120 may receive single user information request 430, and may locate tables (e.g., tables 320-1 through 320-M) that include user information requested by single user information request 430. However, instead of joining tables 320-1 through 320-M together into joined table 330, as described above in connection with FIG. 3, server device 120 may provide tables 320-1 through 320-M directly to client device 110, as further shown in FIG. 4. In one example implementation, tables 320-1 through 320-M may be provided to client device 110 in the same format as they are stored in server device 120. Alternatively, or additionally, one or more tables 320-1 through 320-M may be replaced with other types of data structures, such as linked lists, arrays, trees, etc.

Client device 110 (e.g., via application 410) may receive tables 320-1 through 320-M, and may store tables 320-1 through 320-M in database 420. In one example implementation, client device 110 may join tables 320-1 through 320-M together to create joined table 330. Application 410 may provide a query 450 for user information to database 420, and database 420 may retrieve user information 460 from the stored tables 320-1 through 320-M based on query 450. Application 410 may receive user information 460 from database 420, and may provide user information 460 to appropriate portions (e.g., modules) of application 410. For example, application 410 may populate a user interface for a particular module of application 410 with some or all of user information 460.

Such an arrangement may reduce the load on server device 120 to join tables together for multiple requests from multiple client devices 110. Server device 120 may perform more efficiently (e.g., than as described about in FIG. 3) and may quickly provide the requested user information to client device 110. Thus, client device 110 may be able to display (e.g., via a user interface) the requested user information in a timely manner.

Although FIG. 4 shows example components of network portion 400, in other implementations, network portion 400 may include fewer components, different components, differently arranged components, and/or additional components than depicted in FIG. 4. Alternatively, or additionally, one or more components of network portion 400 may perform one or more other tasks described as being performed by one or more other components of network portion 400.

FIG. 5 is a diagram of example functional components of client device 110. In one implementation, the functions described in connection with FIG. 5 may be performed by one or more components of device 200 (FIG. 2) or by one or more devices 200. As shown in FIG. 5, client device 110 may include database 420, a call log module 500, an IM module 510, a telephone settings module 520, and one or more other modules 530. Database 420 may include the features described above in connection with FIG. 4. In one example implementation, modules 500-530 may be portions of application 410 (FIG. 4).

Call log module 500 may provide information associated with telephone calls received by one or more telephone numbers associated with a user of client device 110. For example, call log module 500 may provide a log of received calls, dialed calls, missed calls, etc. associated with the one or more telephone numbers.

IM module 510 may provide an interface for a user of client device 110 to conduct instant messaging sessions with other users of application 410. For example, IM module 510 may enable client device 110 to provide real-time direct text-based chatting communication between the user of client device 110 and one or more users of other client devices 110.

Telephone settings module 520 may provide information associated with telephone settings of the one or more telephone numbers associated with the user of client device 110. For example, telephone settings module 520 may provide call forwarding information, blocked call information, etc. associated with the one or more telephone numbers.

Other modules 530 may provide information associated with other functionalities of the one or more telephone numbers associated with the user of client device 110. For example, other modules 530 may provide a listing of voicemails received by the one or more telephone numbers, a mechanism to listen to the voicemails, etc.

As further shown in FIG. 5, modules 500-530 may be separate from each other and may be communicated to a user of client device 110 via database 420.

Although FIG. 5 shows example functional components of client device 110, in other implementations, client device 110 may include different functional components, differently arranged functional components, or additional functional components than depicted in FIG. 5. Alternatively, or additionally, one or more functional components of client device 110 may perform one or more other tasks described as being performed by one or more other functional components of client device 110.

FIG. 6 is a diagram of example interactions associated with the functional components of client device 110. As illustrated, client device 110 may include call log module 500, IM module 510, telephone settings module 520, and other modules 530. Call log module 500, IM module 510, telephone settings module 520, and other modules 530 may be part of application 410 (FIG. 4) and may include the features described above in connection with, for example, FIG. 5.

In one example implementation, application 410 of client device 110 may include an option to perform an upgrade of one or more of modules 500-530. In one example, if the user of client device 110 selects the option to perform an upgrade of call log module 500, as indicated by reference number 600, application 410 may perform the upgrade of call log module 500 without affecting operation of modules 510-530 of application 410. In other words, modules 510-530 of application may remain active during the upgrade of call log module 500, as indicated by reference number 610. In one example, the upgrade of a portion (e.g., module) of application 410 may be provided to client device 110 from server device 120, and may include an upgrade to the functionality of the portion of application 410.

As further shown in FIG. 6, when the user wants to upgrade call log module 500, application 410 may unload user information provided in call log module 500, as indicated by reference number 620. Application 410 may temporarily store the user information in, for example, database 420 (not shown). Application 410 may install the upgrade to call log module 500, as indicated by reference number 630, and may reload the user information (e.g., from database 420) to call log module 500, as indicated by reference number 640. After reloading the user information, application 410 may activate the upgraded call log module 500 and the user may utilize the upgraded call log module 500.

Although FIG. 6 shows example functional components of client device 110, in other implementations, client device 110 may include different functional components, differently arranged functional components, or additional functional components than depicted in FIG. 6. Alternatively, or additionally, one or more functional components of client device 110 may perform one or more other tasks described as being performed by one or more other functional components of client device 110.

FIG. 7 is a flow chart of an example process 700 for obtaining information to enable a client device application to access a server device according to an implementation described herein. In one implementation, process 700 may be performed by client device 110. Alternatively, or additionally, some or all of process 700 may be performed by another device or group of devices, including or excluding client device 110.

As shown in FIG. 7, process 700 may include generating a single request for information associated with a user of an application (block 710), and providing the single request to a server device (block 720). For example, in an implementation described above in connection with FIG. 4, instead of generating multiple user information requests, application 410 of client device 110 may generate single user information request 430, and may provide single user information request 430 to server device 120. Single user information request 430 may include a request for user information associated with all of the modules of application 410 (e.g., the call log module, the IM module, the telephone settings module, and/or the other modules).

As further shown in FIG. 7, process 700 may include receiving, based on the single request, tables in a same format as available in the server device (block 730), and storing the tables in a database (block 740). For example, in an implementation described above in connection with FIG. 4, server device 120 may receive single user information request 430, and may locate tables (e.g., tables 320-1 through 320-M) that include user information requested by single user information request 430. Server device 120 may provide tables 320-1 through 320-M directly to client device 110. In one example, tables 320-1 through 320-M may be provided to client device 110 in the same format as they are stored in server device 120. Client device 110 (e.g., via application 410) may receive tables 320-1 through 320-M, and may store tables 320-1 through 320-M in database 420.

Returning to FIG. 7, process 700 may include querying tables in the database for user information (block 750), and providing the user information retrieved based on the query to the application (block 760). For example, in an implementation described above in connection with FIG. 4, application 410 may provide query 450 for user information to database 420, and database 420 may retrieve user information 460 from the stored tables 320-1 through 320-M based on query 450. Application 410 may receive user information 460 from database 420, and may provide user information 460 to appropriate portions (e.g., modules) of application 410. In one example, application 410 may populate a user interface for a particular module of application 410 with some or all of user information 460.

FIG. 8 is a flow chart of an example process 800 for upgrading a module of a client device application according to an implementation described herein. In one implementation, process 800 may be performed by client device 110. Alternatively, or additionally, some or all of process 800 may be performed by another device or group of devices, including or excluding client device 110.

As shown in FIG. 8, process 800 may include executing an application that includes multiple modules (block 810), and receiving selection of an upgrade of a particular module of the multiple modules (block 820). For example, in an implementation described above in connection with FIG. 6, call log module 500, IM module 510, telephone settings module 520, and other modules 530 may be part of application 410 of client device 110. Application 410 may include an option to perform an upgrade of one or more of modules 500-530. If the user of client device 110 selects the option to perform an upgrade of call log module 500, as indicated by reference number 600, application 410 may perform the upgrade of call log module 500. In one example, the upgrade of a portion (e.g., module) of application 410 may be provided to client device 110 from server device 120, and may include an upgrade to the functionality of the portion of application 410.

As further shown in FIG. 8, process 800 may include maintaining the functionality of the multiple modules, other than the particular module, during the upgrade of the particular module (block 830), and unloading information from the particular module (block 840). For example, in an implementation described above in connection with FIG. 6, application 410 may perform the upgrade of call log module 500 without affecting operation of modules 510-530 of application 410. In other words, modules 510-530 of application may remain active during the upgrade of call log module 500, as indicated by reference number 610. When the user wants to upgrade call log module 500, application 410 may unload user information provided in call log module 500, as indicated by reference number 620.

Returning to FIG. 8, process 800 may include installing the upgrade of the particular module (block 850), and reloading the information to the upgraded particular module (block 860). For example, in an implementation described above in connection with FIG. 6, application 410 may temporarily store the user information in, for example, database 420. Application 410 may install the upgrade to call log module 500, as indicated by reference number 630, and may reload the user information (e.g., from database 420) to call log module 500, as indicated by reference number 640. After reloading the user information, application 410 may activate the upgraded call log module 500 and the user may utilize the upgraded call log module 500.

Systems and/or methods described herein may enable a client device to provide a single request for user information to a server device. The server device may provide the user information to the client device via tables provided in a same format as available in the server device. The client device may extract the user information from the tables, and may provide the user information to a client device application. The systems and/or methods may also enable a portion (e.g., a module) of the client device application to be upgraded without affecting operation of remaining portions of the client device application.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 7 and 8, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
accessing, by a device, information associated with a plurality of portions of an application provided by the device,
each of the plurality of portions being associated with a different feature of the application;
determining, by the device and based on accessing the information, that information associated with each of the plurality of portions of the application is needed;
generating, by the device and based on determining that the information associated with each of the plurality of portions of the application is needed, a single request for user information,
the single request including a request for information for each of the plurality of portions of the application;
providing, by the device, the single request to a server device;
receiving, by the device and based on the single request, information included in a plurality of tables in a same format as available in the server device,
the information included in the plurality of tables not being joined together by the server device;
storing, by the device, the information included in the plurality of tables in a database associated with the device;
querying, by the device, the information included in the plurality of tables in the database for the user information; and
providing, by the device and to the application, the user information retrieved based on the query.

2. The method of claim 1, further comprising:
providing at least a portion of the user information to each of the plurality of portions of the application.

3. The method of claim 1, further comprising:
providing, for display, the user information in the application via a user interface associated with the device.

4. The method of claim 1, further comprising:
joining the information included in the plurality of tables together prior to storing the one or more tables in the database.

5. The method of claim 1, where the plurality of portions include:
a first portion associated with call log information,
a second portion associated with instant messaging information, and
a third portion associated with telephone settings information.

6. The method of claim 1, further comprising:
receiving information identifying an upgrade of a first portion of the plurality of portions; and
installing, based on receiving the information identifying the upgrade, the upgrade.

7. The method of claim 6, where a second portion, of the plurality of portions, remains active during the installation of the upgrade,
the second portion being different than the first portion.

8. A device comprising:
a memory to store an application; and
a processor to:
access information associated with a plurality of portions of the application, each of the plurality of portions being associated with a different feature of the application;
determine, based on accessing the information, that information associated with each of the plurality of portions of the application is needed;
generate, based on determining that the information associated with each of the plurality of portions of the application is needed, a single request for user information,
the single request including a request for information for each of the plurality of portions of the application;
provide, to a server device, the single request for the user information;
receive, from the server device and based on the single request, information included in a plurality of tables in a same format as the information included in the plurality of tables is stored in the server device,
the information included in the plurality of tables not being joined together by the server device,
store the information included in the plurality of tables in a database associated with the device,
query the information included in the plurality of tables in the database for the user information, and
provide, to the application, the user information retrieved based on the query.

9. The device of claim 8, where the processor is further to:
provide at least a portion of the user information to each of the plurality of portions of the application.

10. The device of claim 8, where the processor is further to:
provide, for display, the user information in the application via a user interface associated with the device.

11. The device of claim 8, where the processor is further to:
join the information included in the plurality of tables together prior to storing the information included in the plurality of tables in the database.

12. The device of claim 8, where
the plurality of portions include:
a first portion associated with call log information,
a second portion associated with instant messaging information, and
a third portion associated with telephone settings information.

13. The device of claim 8, where the processor is further to:
receive information identifying an upgrade of a first portion of the plurality of portions; and
install, based on receiving the information identifying the upgrade, the upgrade.

14. The device of claim 13, where a second portion, of the plurality of portions, remains active during the installation of the upgrade,
the second portion being different than the first portion.

15. A non-transitory computer-readable medium storing instructions, the instructions comprising:
one or more instructions which, when executed by a processor of a device, cause the processor to:
access information associated with a plurality of portions of an application provided by the device,
each of the plurality of portions being associated with a different feature of the application;
determine, based on accessing the information, that information associated with each of the plurality of portions of the application is needed;
generate, by the device and based on determining that the information associated with each of the plurality of portions of the application is needed, a single request for user information,
the single request including a request for information for each of the plurality of portions of the application;
provide, to a server device, the single request for the user information;
receive, from the server device and based on the single request, information included in a plurality of tables in a same format as the information included in the plurality of tables is stored in the server device,
the information included in the plurality of tables not being joined together by the server device,
store the information included in the plurality of tables in a database associated with the device,
query the information included in the plurality of tables in the database for the user information, and
provide, to the application, the user information retrieved based on the query.

16. The non-transitory computer-readable medium of claim 15, where the instructions further include:
one or more instructions to provide at least a portion of the user information to each of the plurality of portions of the application.

17. A non-transitory computer-readable medium of claim 15, where the instructions further include:
one or more instructions to provide, for display, the user information in the application via a user interface associated with the device.

18. The non-transitory computer-readable medium of claim 15, where the instructions further include:
one or more instructions to join the information included in the plurality of tables together prior to storing the information included in the plurality of tables in the database.

19. The non-transitory computer-readable medium of claim 15, where the plurality of portions include:
a first portion associated with call log information,
a second portion associated with instant messaging information, and
a third portion associated with telephone settings information.

20. The non-transitory computer-readable medium of claim 15, where the instructions further include:

one or more instructions to receive information identifying an upgrade of a first portion of the plurality of portions; and one or more instructions to install, based on receiving the information identifying the upgrade, the upgrade, and a second portion, of the plurality of portions, remains active during the installation of the upgrade, the second portion being different than the first portion.

* * * * *